Figure 1:
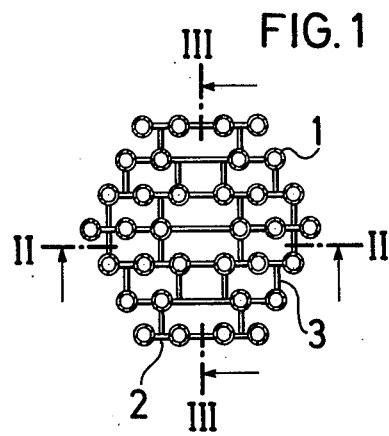

United States Patent
Goebel

[11] 4,029,143
[45] June 14, 1977

[54] POLYMERIZATION REACTOR WITH GILLED-TUBE RADIATOR AND AXIAL AGITATOR

[75] Inventor: Paul Goebel, Altona, Australia

[73] Assignee: Hoechst Aktiengesellschaft, Frankfurt am Main, Germany

[22] Filed: Aug. 27, 1975

[21] Appl. No.: 608,258

[30] Foreign Application Priority Data

Aug. 29, 1974 Germany .......................... 2441302
Feb. 6, 1975 Germany .......................... 2504926

[52] U.S. Cl. ............................... 165/109; 259/8
[51] Int. Cl.² .................................. F28F 13/12
[58] Field of Search ................... 165/109; 259/8

[56] References Cited

UNITED STATES PATENTS

| | | | |
|---|---|---|---|
| 2,085,924 | 7/1967 | Riegler | 165/109 X |
| 2,174,318 | 9/1969 | Ellis | 165/109 X |
| 2,664,274 | 12/1953 | Worn et al. | 165/109 |
| 2,764,476 | 9/1956 | Etter | 165/109 X |
| 2,973,944 | 3/1961 | Etter | 165/109 X |
| 3,053,512 | 9/1962 | Soudan et al. | 165/109 X |
| 3,280,899 | 10/1966 | Brasie | 165/109 |
| 3,373,802 | 3/1968 | Wiklund et al. | 165/109 X |

FOREIGN PATENTS OR APPLICATIONS

| | | | |
|---|---|---|---|
| 363,265 | 7/1956 | France | 165/109 |
| 276,120 | 7/1930 | Italy | 165/109 |

*Primary Examiner*—Irwin C. Cohen
*Attorney, Agent, or Firm*—Curtis, Morris & Safford

[57] ABSTRACT

Polymerization reactor with agitator having axial action which circulates the reactor content substantially in a flow parallel to the reactor walls and parallel to the concentrically arranged interior coolers consisting of parallel U-shaped tubes; the reactor optionally containing from two to 10 horizontal tube coolers in addition.

4 Claims, 9 Drawing Figures

POLYMERIZATION REACTOR WITH GILLED-TUBE RADIATOR AND AXIAL AGITATOR

The present invention relates to a polymerization reactor with gilled-tube radiator and axial agitator.

It is known that polymerization reactions proceed with considerable heat generation, and a good dissipation of the reaction heat is not only required for safety reasons, but also for a uniform product quality.

Special attention has therefore been paid for a long time to the development of optimum cooling systems. Usually, the polymerization vessel is provided with exterior condenser coils and with one or more interior cooling fingers. The efficiency of such cooling equipment is proportional to the heat exchanger area disposed of, the temperature difference between the liquid to be cooled and the coolant, and the coefficient of heat transmission on the cooling surfaces.

Furthermore, the flow conditions in the polymerization reactor are of decisive importance. By means of a suitable agitator system, a flow has to be produced which ensures uniform circulation of the whole reaction medium and its intimate contact with the cooling surfaces. Only in the case where the contents of the vessel flow uniformly through its total volume, a steady and uniform contact with the cooling equipment is ensured and thus the maintenance of a uniform temperature in the reaction medium everywhere in the vessel. Of course, the creation of such a sufficient flow in the reactor is especially difficult in the case where the contents of very large reactors must be circulated.

For this purpose, agitator systems working according to the radial conveying principle have been hitherto used. They produce a vigorous liquid flow in the direction of the reactor walls, where the flow is divided and deflected upwards and downwards. Furthermore, these systems set the contents of the vessel in a rotating motion, which, however, has to be braked by flow interruptors which may be designed as cooling fingers, since otherwise there would be poor blending and formation of a large vortex. However, it is disadvantageous that the flow interruptors and cooling fingers cannot be mounted at a length and number — for example about 0.5 m above the agitator — as desired in order to obtain an optimum cooling effect. Placing of flow interruptors is a problem in the case of large reactors having a capacity of more than 30 m$^3$, where, especially in the upper half, no thorough mixing can be achieved. Therefore, in order to improve the blending of the reactor contents, several agitators are often used. However, this is not always the proper solution of the problem, since these agitators may mutually neutralize their effect and thus do not increase the agitating action over the total volume.

The importance of a sufficient dissipation of reaction heat in polymerization reactions appears from the fact that the performance of a polymerization reactor depends on the solution of this problem.

The space-time yield (kg of polymer per m$^3$ of reactor volume and hours) of a reactor depends on the speed of reaction heat dissipation. The polymerization speed as such and the speed of monomer dissolution in the solvent attain a level which would allow a better space-time yield of the reactor if only the reaction heat could be dissipated with sufficient rapidity.

A very simple method for increasing the heat dissipation is a partial evaporation and condensation of the solvent in a condenser on top of the reactor. However, this method can only be applied in the case where the polymerization can be carried out at boiling temperature of the solvent.

A further method for attaining an increased heat disdipation is a considerable reduction of the temperature of the coolant. However, this method is disadvantageous because it is very expensive. Furthermore, for example in the case where olefins are polymerized, wax layers are formed very soon on the cooling surfaces, which of course is undesirable because these deposits prevent heat dissipation to a great extent. In order to keep such wax deposits as small as possible, the temperature difference between coolant and reactor contents should not become too great.

It has already been attempted to prevent the formation of wax deposits in polymerization vessels. In German Auslegeschrift No. 2,032,700, a cylindrical large-scale autoclave is described the interior of which is provided with a multi-blade agitator, and two identical flow guide plates are pivoted in adjustable manner on the interior wall of the autoclave in a radialsymmetric position and on the same level in the upper third of the vessel. Although this design has a positive influence on the formation of wax deposits, it does not bring about an increased heat dissipation.

The above problems are solved in a simple manner by the polymerization reactor of the present invention. This reactor comprises as substantial elements an agitator of axial action and concentrically arranged gilled-tube radiators; the cooling effect optionally being increased by additional horizontal tube coolers. A completely uniform reaction temperature in the reactor is obtained by incorporating two to 10 horizontal tube coolers in the reactor in addition to the concentrically mounted gilled-tube radiators. It is recommended to provide the horizontal tube coolers with one or more stiffeners in order to prevent oscillation of the tubes which otherwise would be inevitable.

Agitators having axial action are known. Their application in polymerization vessels, however, has not been described hitherto, in which vessels, in combination with gilled-tube radiators, they contribute to solve the technical problems arising. It is a characteristic item of axial agitators that they produce a flow in the reactor which ascends along the walls from bottom to top and descends again in the center of the vessel. The advantage of the mainly axial flow of the liquid so produced resides in the fact that it rises vertically and parallelly to the walls of the vessel and the cooling fingers to the top, so that the flow energy generated by the agitator pulse is maintained to a great extent. Simultaneously, this direction of flow ensures a thorough intermixing of the liquid during its ascension and thus an optimum heat exchange.

Furthermore, when using an agitator having axial action, the driving power of the agitator may be reduced. Since in this case there are nearly no energy losses by flow braking, the driving energy is only half that of a corresponding radial agitator, although a completely uniform and homogeneous blending of the reactor contents is ensured. Moreover, it is possible to use several agitators in the vessel, since their action sums up, so that any size of vessel may be chosen. The flow produced by the axial agitator is intense and uniform to such an extent that temperature differences within the reaction medium cannot be detected any more. Furthermore, it has thus become possible to increase the number of cooling fingers as desired, since they are no obstacle in an ascending flow. On the contrary, at optimum position, they may even increase the pumping performance and thus the action of the axial agitator and, because of their flow interruption effect, keep the vortex formed in the reactor insignificant, regardless of the level of the charged batch. Therefore, it has now become possible to arrange concentrically a great number of interior coolers in the reaction vessel.

Figure 6:
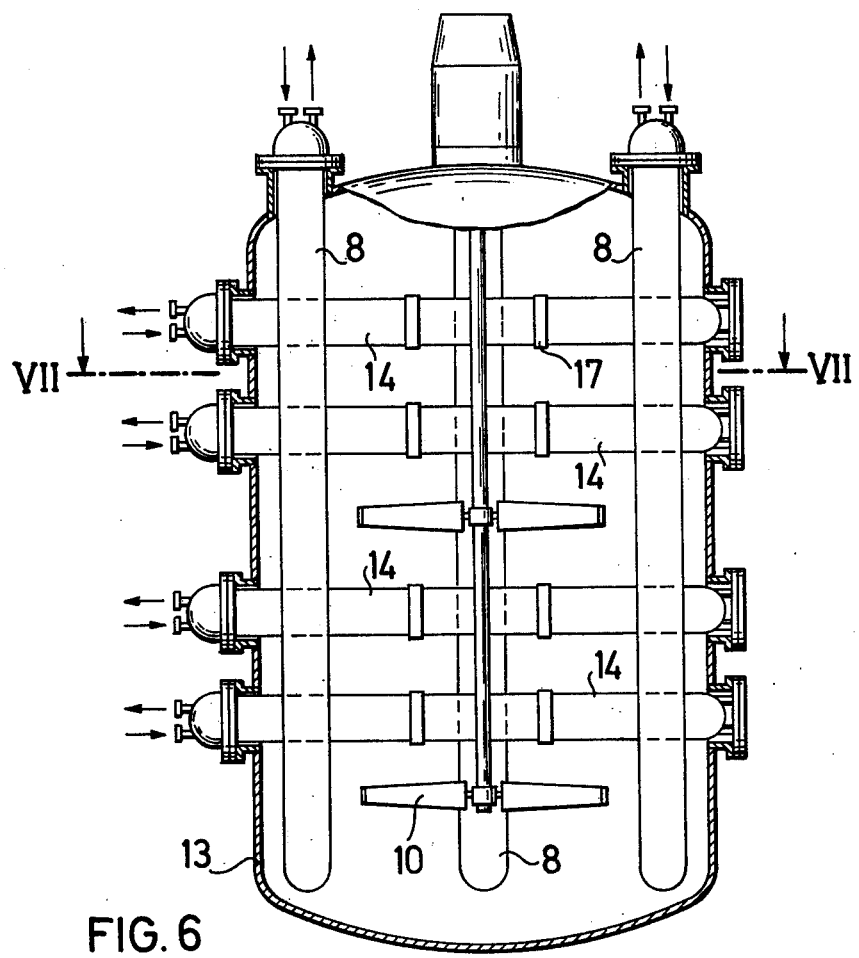
Figure 7:
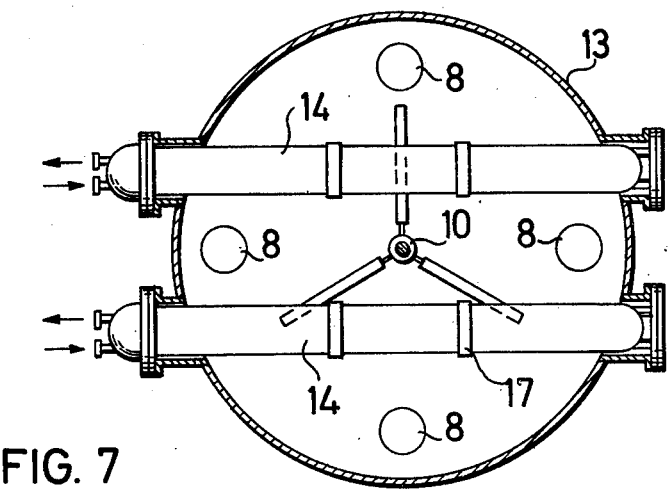
Figure 8:
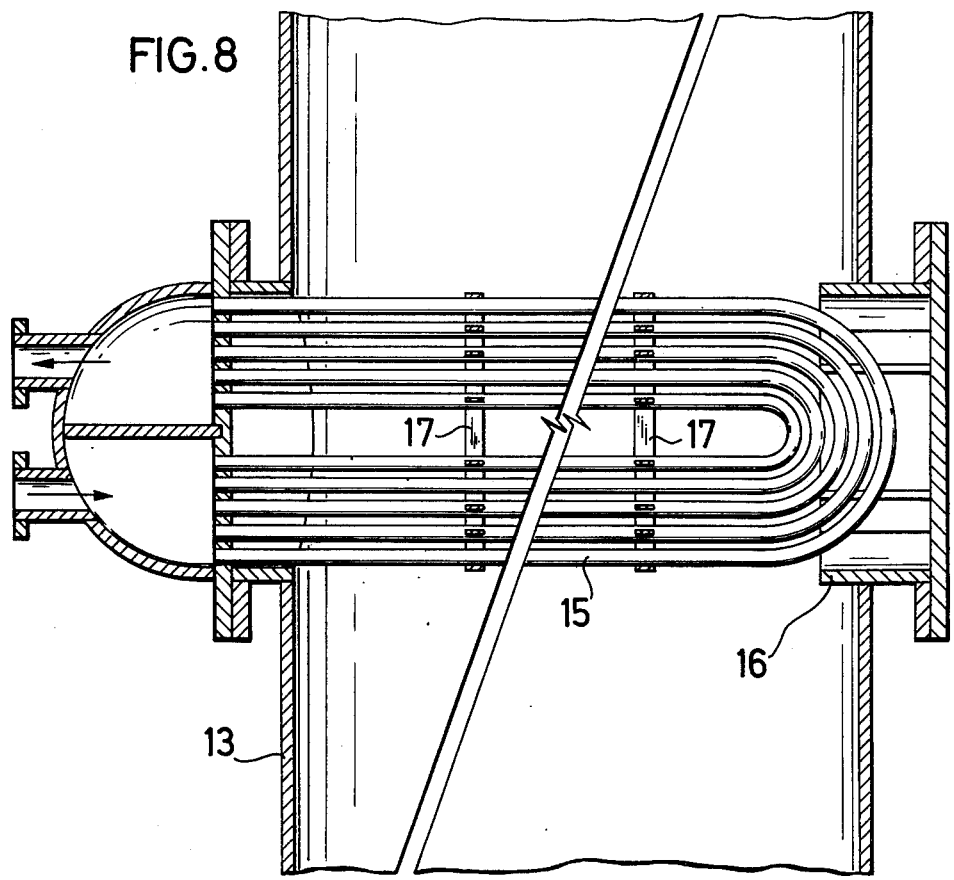
Figure 9:
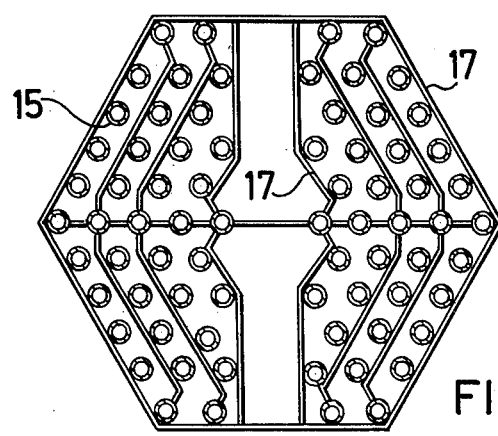

The improvement in heat dissipation obtained by using an agitator having axial action is utilized in an especially favorable manner in the case where the cooling area of the interior coolers is enlarged. Because of the improved heat transfer on the heat exchanger surfaces in the reactor and because of the enlarged heat exchanger area, the temperature of the coolant may be increased, thus preventing the annoying wax layers on the cooling surfaces. The cooling area is increased in an especially efficient manner by means of a so-called gilled-tube radiator. This gilled-tube radiator consists of a bundle of parallel U-shaped tubes, as shown in FIGS. 1 to 9 of the accompanying drawings, of which FIG. 1 represents a cross-sectional view of a gilled-tube radiator, FIG. 2 is a longitudinal cross-sectional view of plane II—II of FIG. 1, and FIG. 3 is a longitudinal cross-sectional view of plane III—III of FIG. 1, FIG. 4 is a vertical sectional view of a polymerization vessel containing the radiator of FIG. 2, FIG. 5 is a sectional view taken along line V—V of FIG. 4, FIG. 6 is a vertical sectional view similar to FIG. 4 of another embodiment of the present invention, FIG. 7 is a sectional view taken along line VII—VII of FIG. 6, FIG. 8 is a longitudinal sectional view of a horizontal tube cooler of the type used in the embodiment of FIG. 6, and FIG. 9 is a cross sectional view of the horizontal tube cooler of FIG. 8.

Figure 2:
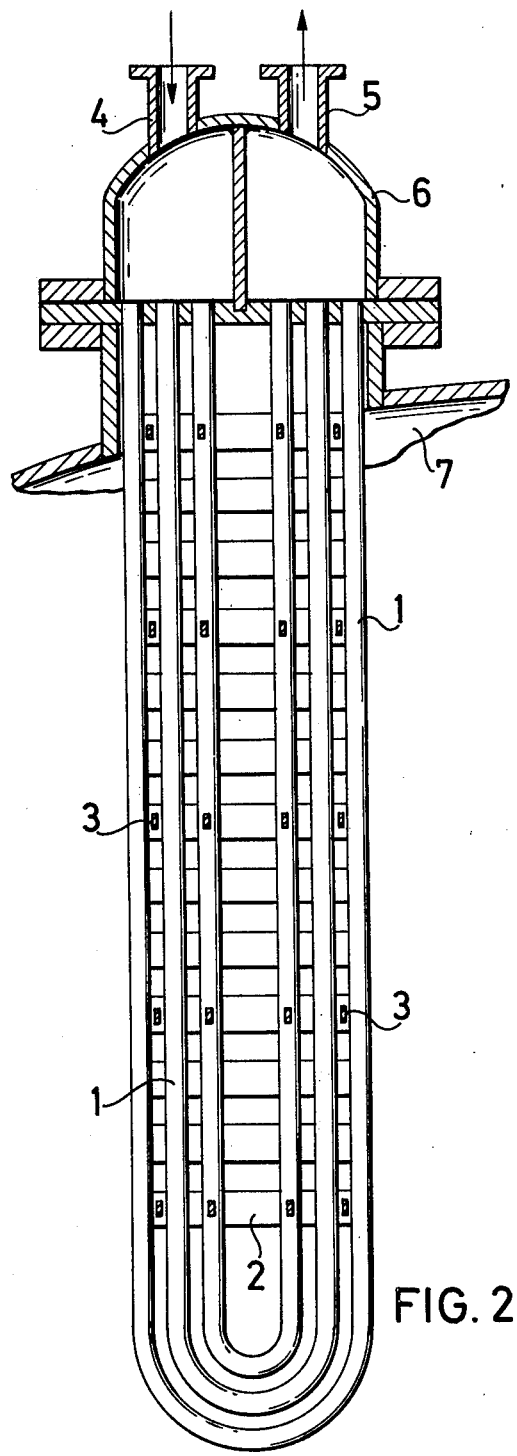
Figure 3:
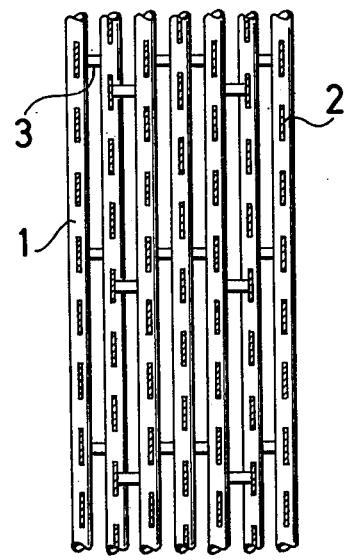

Referring now to these FIGS. 1 to 3, from about five to 30 U-shaped tubes 1 are combined to form a unit by means of a skeleton of vertically positioned metal plates. Part of these metal plates serve as flow interruptors 2, and part of them as spacers 3. FIG. 2 shows that the cooling water enters the radiator suspended in the wall of the vessel 7 via inlet 4 and radiator head 6, and that it leaves via radiator head 6 and outlet 5.

Of course, such a gilled-tube radiator, because of the considerably increased cooling area, is by far more efficient than the interior coolers hitherto used. A further advantage resides in the fact that a good and uniform flow along the whole heat exchanger surface is ensured, since the liquid may ascend also between the tube bundles. The special arrangement allows a simple mounting or removal of the radiator for cleaning purposes.

Figure 4:
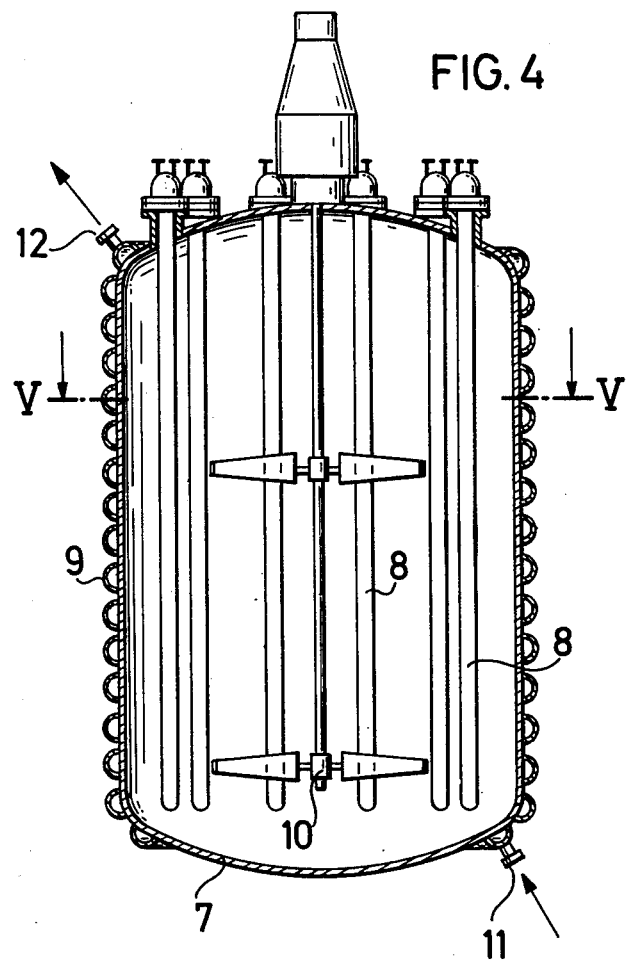
Figure 5:
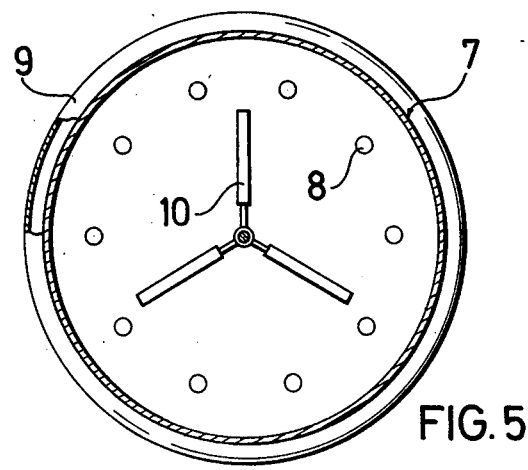

Although the axial agitator per se, as well as the gilled-tube radiator alone, contribute considerably to an improved heat dissipation in polymerization systems, a still better effect is achieved by a combination of both these elements, as shown in FIGS. 4 and 5 of the accompanying drawings, of which FIG. 4 represents a longitudinal cross-sectional view of a polymerization vessel containing both the above elements, and FIG. 5 is a cross-sectional view of plane V—V of FIG. 4.

Referring now to FIGS. 4 and 5, the polymerization vessel 7 is provided with gilled-tube radiators 8, a condenser coil 9 and an axial agitator 10. The cooling water enters the condenser coil 9 via inlet 11 and it leaves via outlet 12.

Such a reaction vessel is generally suitable for all polymerization reactions, but it is especially recommended for the manufacture of polyolefins, such as high density polyethylene or polypropylene, and of polyvinyl chloride or polystyrene.

By combining axial agitator and gilled-tube radiators of the invention, the reaction heat is dissipated at such a degree of efficiency that the space-time yields are considerably increased. Simultaneously, the intimate intermixing and uniform temperature distribution in the reactor results in a more homogeneous product quality than hitherto achieved.

A special advantage of a reactor having additional horizontal tube coolers resides in the fact that an exterior cooling can be completely renounced of the good performance of the various interior cooling system.

A reactor of this type is shown in FIGS. 6 and 7 of the accompanying drawings, of which FIG. 6 represents a longitudinal cross-sectional view of such a polymerization reactor, and FIG. 7 is across-sectional view of plane VII—VII of FIG. 6.

Referring now to FIG. 6, the polymerization reactor 13 is provided with the vertically positioned gilled-tube radiators 8 in concentric arrangement, and the horizontal tube coolers 14 with stiffeners 17, arranged in adjacent and super-position. The axial agitator 10 is also shown.

Referring to FIG. 7, the cross-sectional view shows the position of the gilled-tube radiators 8, the horizontal tube coolers 14 with stiffeners 17, and the agitator 10 in the polymerization reactor.

FIG. 8 of the accompanying drawings represents a longitudinal cross-sectional view of one of the horizontal tube coolers, consisting of a bundle of parallel U-shaped tubes 15 through which the cooling water flows. The lower end of the tube cooler is mounted to the opposite wall by means of a suitable support.

FIG. 9 is a cross-sectional view of such a horizontal tube cooler, clearly showing the stiffeners 17 which are to prevent oscillation.

By incorporating additional horizontal tube coolers, the cooling area contained in the reactor is increased to such an extend that the cooling water may be circulated at elevated inlet and outlet temperatures. While the hitherto known cooling systems the cooling water entering the reactor has a temperature of about 15° – 20° C and a temperature of about 30° – 40° C when leaving, the cooling system of the invention allows the use of cooling water having temperatures of 35° – 40° C and 50° – 69° C, respectively. Thus, it is possible to recool the water leaving the system to the feeding temperature of 35° – 40° C by means of air cooling, so that it may be recycled, which is very advantageous in view of the rising price of water. Moreover, such a closed circulation system ensures clean cooling surfaces also on the side of the water and thus high heat transfer yields. Time losses due to standstill for cleaning purposes are avoided, and corrosion, occuring in usual systems employing cooling water from recooling towers, is absolutely prevented.

What is claimed is:

1. A polymerization reactor comprising, in combination, a hollow reaction vessel having top, bottom and side walls, axial agitator means for circulating polymerization products in the reactor along a flow path which ascends along said side walls from said bottom wall to said top wall and descends from said top wall towards said bottom wall in the central portion of the reaction vessel, and a plurality of separate internal cooling units mounted on the top wall of said vessel in a predetermined, uniform array near the side walls of the vessel and extending downwardly from said top wall towards said bottom wall, each of said cooling units including a header mounted on said top wall, defining separate inlet and outlet chambers, a plurality of hollow generally U-shaped heat transfer tubes each of which has a pair of generally parallely extending legs respectively connected in communication with said inlet and outlet chambers and a bight portion connecting the legs and being located near said bottom wall, a plurality of separate metal plates connecting the legs of said tubes to each other and to the legs of other tubes in the unit and to other plates, said plates maintaining a predetermined spacing between said tubes and interrupting flow about said tubes to enhance mixing and cooling, and a plurality of cooling units mounted on the side wall of the vessel and extending horizontally through said vessel transversely to the vertically extending cooling units.

2. A polymerization reactor as defined in claim 1 wherein said reaction vessel is generally cylindrical and said cooling units are concentrically arrayed with respect to the side walls of the vessel.

3. A polymerization reactor as defined in claim 2 wherein said plurality of horizontally extending cooling units comprise between two and ten units.

4. A polymerization reactor as defined in claim 3 including means in said horizontally extending cooling units for stiffening the tubes thereof to resist oscillation and vibration of the tubes.

* * * * *